US010042337B2

United States Patent
Kitajima

(10) Patent No.: US 10,042,337 B2
(45) Date of Patent: Aug. 7, 2018

(54) ELECTRICAL APPARATUS HAVING FLOW CREATOR

(71) Applicant: BROTHER KOGYO KABUSHIKI KAISHA, Nagoya-shi, Aichi-ken (JP)

(72) Inventor: Tetsuya Kitajima, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 562 days.

(21) Appl. No.: 14/668,411

(22) Filed: Mar. 25, 2015

(65) Prior Publication Data
US 2015/0279560 A1    Oct. 1, 2015

(30) Foreign Application Priority Data

Mar. 28, 2014 (JP) ................................ 2014-069624

(51) Int. Cl.
*H01G 2/08* (2006.01)
*G05D 7/06* (2006.01)
(Continued)

(52) U.S. Cl.
CPC .............. *G05B 15/02* (2013.01); *G05D 23/20* (2013.01); *H01G 4/1227* (2013.01); *H01G 4/30* (2013.01)

(58) Field of Classification Search
CPC ...... G05B 15/02; G05D 23/20; H01G 4/1227; H01G 4/30
(Continued)

(56) References Cited

U.S. PATENT DOCUMENTS

| 2,842,345 A * | 7/1958 | Brown ............... G05D 23/2036 165/109.1 |
| 2004/0096229 A1* | 5/2004 | Yoshihara .......... H05K 7/20145 399/33 |

(Continued)

FOREIGN PATENT DOCUMENTS

| JP | 55-170783 U | 12/1980 |
| JP | 60-39116 U | 3/1985 |

(Continued)

OTHER PUBLICATIONS

Japanese Office Action issued in corresponding Japanese Patent Application No. 2014-069624, dated Nov. 22, 2016.

*Primary Examiner* — Mohammed Ali
*Assistant Examiner* — Joshua Sanders
(74) *Attorney, Agent, or Firm* — Merchant & Gould P.C.

(57) ABSTRACT

An electrical circuit is provided in a casing. The electrical circuit includes a capacitor having a particular function needed for realizing the electrical circuit. The electrical circuit includes an electrical component configured to generate heat due to energization. A flow creator creates, in the casing, an air flow that flows in a direction from the electrical component to the capacitor such that air heated by heat generation of the electrical component flows to the capacitor. A controller controls the flow creator. The capacitor has a characteristic that capacitance monotonically decreases or monotonically increases as temperature rises, in a part of a temperature range in which the electrical circuit operates. The controller detects a capacitance change due to a temperature change of the capacitor caused by the air heated by the heat generation, and controls the flow creator based on a detection result of the capacitance change.

13 Claims, 5 Drawing Sheets

(51) Int. Cl.
  *G05B 15/02* (2006.01)
  *G05D 23/20* (2006.01)
  *H01G 4/12* (2006.01)
  *H01G 4/30* (2006.01)
  *H05K 7/20* (2006.01)

(58) Field of Classification Search
  USPC .......................................................... 700/282
  See application file for complete search history.

(56) References Cited

U.S. PATENT DOCUMENTS

2013/0031396 A1* 1/2013 Inukai ................... H02M 7/066
　　　　　　　　　　　　　　　　　　　　　　713/323
2013/0129373 A1   5/2013 Inukai

FOREIGN PATENT DOCUMENTS

| JP | 6-91986 A | 4/1994 |
| JP | 8-44275 A | 2/1996 |
| JP | 2005-018309 A | 1/2005 |
| JP | 2006-17776 A | 1/2006 |
| JP | 2009-157183 A | 7/2009 |
| JP | 2010-68670 A | 3/2010 |
| JP | 2012-110124 A | 6/2012 |
| JP | 2012110124 A * | 6/2012 |
| JP | 2013-110789 A | 6/2013 |

* cited by examiner

ELECTRICAL APPARATUS HAVING FLOW CREATOR

CROSS REFERENCE TO RELATED APPLICATIONS

This application claims priority from Japanese Patent Application No. 2014-069624 filed Mar. 28, 2014. The entire content of the priority application is incorporated herein by reference.

TECHNICAL FIELD

The invention relates to an electrical apparatus having a flow creator and to a method of controlling a flow creator in an electrical apparatus.

BACKGROUND

Conventionally, in an image recording apparatus such as an inkjet printer, a fan is provided for cooling an electrical component that generates heat during energization in the apparatus. In this case, if the fan continues rotating during energization, the fan is rotated even though the electrical component is cooled sufficiently, which leads to wasteful consumption of electric power for rotation of the fan. Conversely, if rotation of the fan is stopped in a state where the electrical component is not cooled sufficiently and if energization to the electrical component is continued, there is a possibility that the life of the electrical component is shortened.

SUMMARY

According to one aspect, this specification discloses an electrical apparatus. The electrical apparatus includes a casing, an electrical circuit, a flow creator, and a controller. The electrical circuit is provided in the casing. The electrical circuit includes a capacitor having a particular function needed for realizing the electrical circuit. The electrical circuit includes an electrical component configured to generate heat due to energization. The flow creator is configured to create, in the casing, an air flow that flows in a direction from the electrical component to the capacitor such that air heated by heat generation of the electrical component flows to the capacitor. The controller is configured to control the flow creator. The capacitor has a characteristic that capacitance monotonically decreases or monotonically increases as temperature rises, in a part of a temperature range in which the electrical circuit operates. The controller is configured to detect a capacitance change due to a temperature change of the capacitor caused by the air heated by the heat generation, and to control the flow creator based on a detection result of the capacitance change.

BRIEF DESCRIPTION OF THE DRAWINGS

Embodiments in accordance with the invention will be described in detail with reference to the following figures wherein.

DETAILED DESCRIPTION

Figure 1:
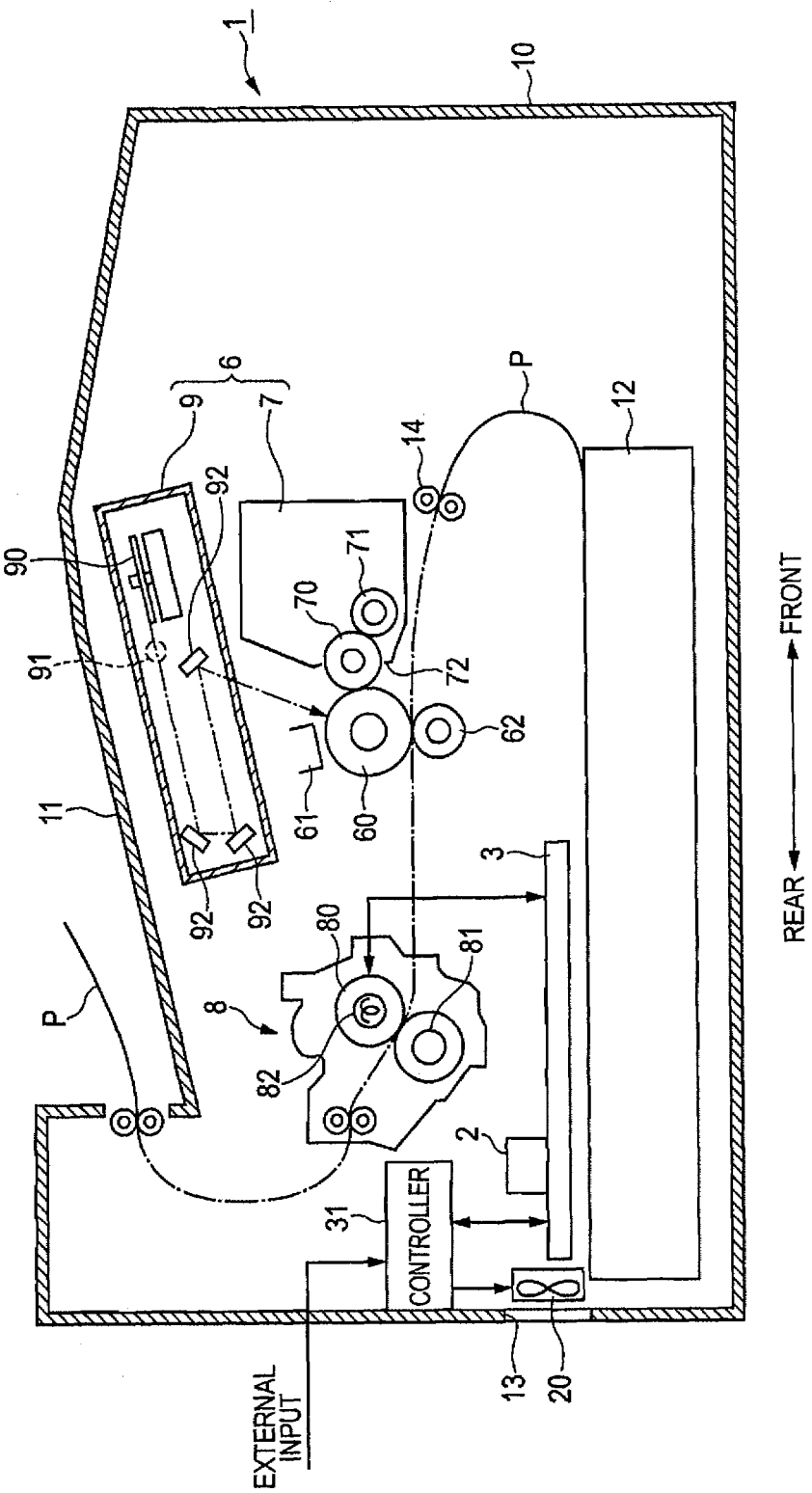
FIG. 1 is a schematic diagram showing a configuration of a laser printer according to an embodiment.

Some aspects of the invention will be described while referring to the accompanying drawings. In the following descriptions, like parts and components are designated by the same reference numerals to avoid duplicating description. In the present embodiment, an image recording apparatus (for example, a laser printer) that prints an image on paper (recording medium) is illustrated as an example of an electrical apparatus. However, the electrical apparatus is not limited to this, and may be an inkjet recording apparatus, for example.

FIG. 1 shows a laser printer 1 of a monochromatic type for simplification purposes, but the laser printer 1 may be a color laser printer. A paper feeding tray 12 on which paper P is stacked is provided at a lower part in a casing 10 of the laser printer 1. Paper P in the paper feeding tray 12 is picked up and conveyed one sheet at a time by the pair of supply rollers 14. Above the paper feeding tray 12 in the casing 10, an image forming device 6, a fixing device 8, and a paper discharging tray 11 are provided along a conveying direction of paper P. The image forming device 6 and the fixing device 8 perform processes of "charging", "exposing", "developing", "transferring", and "fixing" that are basic processes for performing image formation in the laser printer 1.

The laser printer 1 forms, in the image forming device 6, a toner image on paper P fed from the paper feeding tray 12, thermally fixes the toner image to perform a fixing process in the fixing device 8, and then discharge the paper P on which the toner image is fixed to the paper discharging tray 11.

The image forming device 6 includes a scanner 9, a developing cartridge 7, a photosensitive drum 60, a charger 61, and a transfer roller 62. The developing cartridge 7 is detachably provided in the casing 10. The scanner 9 is located above the developing cartridge 7.

The scanner 9 has a known configuration that laser light from a light emitter 91 is irradiated, via a polygon mirror 90 and a plurality of reflecting mirrors 92, onto a surface of the photosensitive drum 60 by high-speed scanning.

The developing cartridge 7 accommodates therein toner which is chargeable powder. A developing roller 70 and a supplying roller 71 confronting each other are provided adjacent to a toner supply opening 72 formed in a lower side of the developing cartridge 7. The developing roller 70 confronts the photosensitive drum 60. The charger 61 is disposed above the photosensitive drum 60. The transfer roller 62 is provided below the photosensitive drum 60, and conveys paper P in cooperation with the photosensitive drum 60.

When paper P is conveyed, the photosensitive drum 60 is rotated, and the surface of the photosensitive drum 60 is charged to a positive polarity, for example, by the charger 61. An electrostatic latent image is formed on the photosensitive drum 60 by laser light from the scanner 9. When the photosensitive drum 60 rotates in contact with the developing roller 70, toner borne on the developing roller 70 is supplied to the electrostatic latent image on the surface of the photosensitive drum 60 so that a toner image is formed. While paper P passes between the photosensitive drum 60 and the transfer roller 62, the toner image is transferred onto the paper P by a transfer bias that is applied to the transfer roller 62. The printed paper P on which the toner image is transferred is conveyed to the fixing device 8.

The fixing device 8 includes a fixing roller 80 and a pressure roller 81. The fixing roller 80 is heated by a heater 82 accommodated therein. The paper P is nippingly held and conveyed by the fixing roller 80 and the pressure roller 81 and is heated by the heater 82, and the toner image is fixed on the paper P. After that, the paper P is discharged onto the paper discharging tray 11 as described above. The electrical circuit 3 in the casing 10 supplies electric power to the heater 82. Note that the electrical circuit 3 also supplies electric power to other driving components in the casing 10.

A transformer 2 for a power source is provided on the electrical circuit 3. A discharge opening 13 for discharging air within the casing 10 to outside of the casing 10 is formed at a portion of the casing 10 confronting the transformer 2. A fan 20 for discharging air through the discharge opening 13 is provided between the discharge opening 13 and the transformer 2. More specifically, the fan 20 is provided between the discharge opening 13 and the capacitors 21, 22. As well known in the art, the transformer 2 transforms an inputted AC voltage and supplies the voltage to a particular electrical component. The transformer 2 generates heat at energization. Thus, the fan 20 air-cools the transformer 2 so as to prevent the transformer 2 from overheating. The fan 20 and the electrical circuit 3 are connected to the controller 31 so that driving operations are controlled. External inputs such as a print instruction are inputted to the controller 31. The controller 31 receives these external inputs and drives components in the casing 10.

The controller 31 includes one of a single CPU, a plurality of CPUs, or a combination of a CPU and an ASIC (Application Specific Integrated Circuit). The controller 31 has a memory function and a timer function of measuring a time period that elapses after an external input is received. Further, the controller 31 processes image information included in print instruction information and also has a function of controlling the scanner 9.

Figure 2:
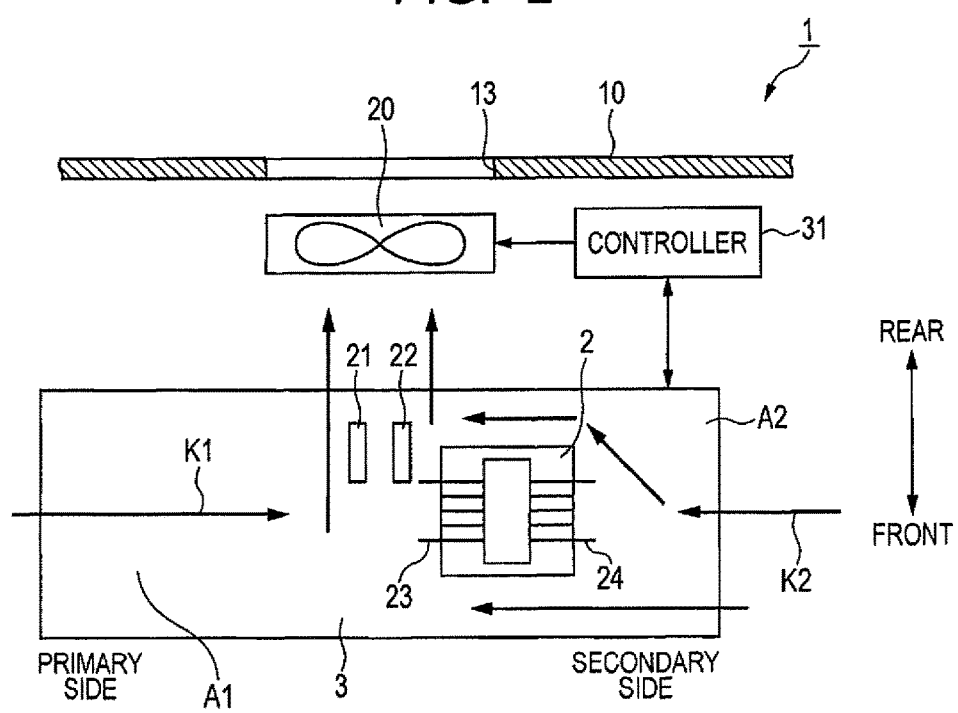
FIG. 2 is a plan view of an electrical circuit having a transformer.

As shown in FIG. 2, on the electrical circuit 3, a first capacitor 21 and a second capacitor 22 are provided between the transformer 2 and the fan 20. The roles of the first capacitor 21 and the second capacitor 22 will be described later. The fan 20 creates, in the casing 10, air flow for discharging air in the casing 10 through the discharge opening 13. That is, the fan 20 is an example of a flow creator.

Although in FIG. 2 the discharge opening 13 is formed at a lateral side (rear side) of the electrical circuit 3, the discharge opening 13 may be formed at an upper side of the electrical circuit 3.

As well known in the art, the transformer 2 includes a primary winding 23 and a secondary winding 24. A plurality of electrical components that generates heat, such as a diode, is provided on the electrical circuit 3, in addition to the transformer 2. Some of these electrical components are connected to the primary winding 23 of the transformer 2, and others are connected to the secondary winding 24. A portion on the electrical circuit 3 connected to the primary winding 23 of the transformer 2 is referred to as a first portion A1, and a portion connected to the secondary winding 24 of the transformer 2 is referred to as a second portion A2. Air flow created by the fan 20 is divided into a first air flow K1 that mainly passes and air-cools the first portion A1 and a second air flow K2 that mainly passes and air-cools the second portion A2. Specifically, the second air flow K2 passes the transformer 2 and cools the transformer 2. The both air flows K1 and K2 join at a position where the first capacitor 21 and the second capacitor 22 are arranged on the electrical circuit 3, and subsequently flow toward the discharge opening 13. In this way, air flow created by the fan 20 flows in a direction from the transformer 2 (upstream side) to the first capacitor 21 and the second capacitor 22 (downstream side).

Because the first air flow K1 and the second air flow K2 pass the transformer 2 and the plurality of electrical components, the air flows K1 and K2 are heated by heat generation of the transformer 2 and the plurality of electrical components. The heated air flows K1 and K2 pass the first capacitor 21 and the second capacitor 22, and hence the both capacitors 21 and 22 are heated. Generally, a capacitor has such a temperature characteristic that, as temperature rises, its capacitance changes. The inventor of the present application conceived controlling rotation of the fan 20 by using the temperature characteristic of the capacitor.

Here, at least one of the first capacitor 21 and the second capacitor 22 has a function needed for realizing the electrical circuit 3. This point will be described below. The laser printer 1 has a normal mode and an OFF mode as operational modes. The normal mode is a mode in which the laser printer 1 performs a printing process immediately in response to a print instruction which is an external input. The OFF mode is a mode in which no print instruction has been transmitted for a period longer than a predetermined period and the laser printer 1 is in a standby state.

Figure 3:
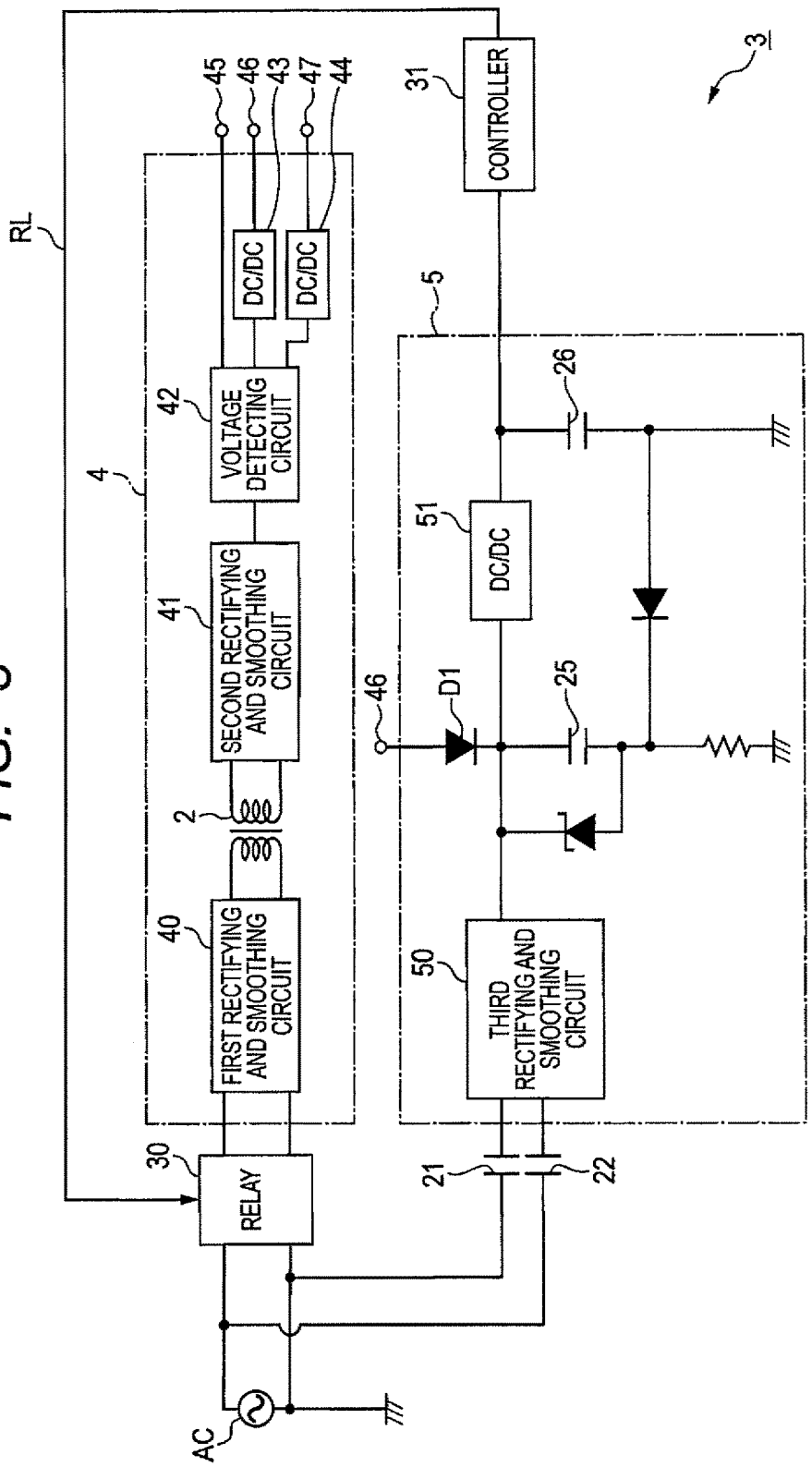
FIG. 3 is a block diagram of the electrical circuit.

As shown in FIG. 3, the electrical circuit 3 includes a relay 30, a switching power supply 4, and a low-capacity power circuit 5. The relay 30 is connected to an alternate-current (AC) power source AC, and is electrically connected to the switching power supply 4, the low-capacity power circuit 5, and the controller 31. The relay 30 is a switching circuit that, when the relay 30 is in an ON state, AC voltage is supplied to the switching power supply 4.

The switching power supply 4 rectifies and smoothes voltage of the AC power source AC, generates DC voltages having different values from one another in the normal mode, and outputs the voltages from a first output terminal 45, a second output terminal 46, and a third output terminal 47. In the OFF mode, no voltages are outputted from the first to third output terminals 45, 46, and 47. The low-capacity power circuit 5 supplies electric power to the controller 31 in the normal mode and in the OFF mode. Note that electric power is supplied to the controller 31 from the third output terminal 47 in the normal mode.

The capacitors 21 and 22 are provided between the AC power source AC and the low-capacity power circuit 5 (hence, between the AC power source AC and the controller 31). The capacitors 21 and 22 allow a current supplied from the AC power source AC to leak therethrough so that the current is supplied to the low-capacity power circuit 5 (and eventually to the controller 31).

The switching power supply 4 includes a first rectifying and smoothing circuit 40, the transformer 2, a second rectifying and smoothing circuit 41, a voltage detecting circuit 42, and two DC-DC converters 43 and 44. The first rectifying and smoothing circuit 40 and the second rectifying and smoothing circuit 41 may be constituted by a diode matrix. The first output terminal 45 is connected to the voltage detecting circuit 42. The second and third output terminals 46 and 47 are connected to the DC-DC converters 43 and 44, respectively. When AC voltage is supplied from the AC power source AC in a state where the relay 30 is ON state, the AC voltage is rectified and smoothed by the first rectifying and smoothing circuit 40, and is supplied to the primary winding of the transformer 2. Voltage induced in the secondary winding of the transformer 2 is rectified and smoothed by the second rectifying and smoothing circuit 41, is supplied to the voltage detecting circuit 42 and the DC-DC converters 43 and 44, and is outputted from the first to third output terminals 45, 46, and 47 as voltages of 24V, 5V, and 3.3V, respectively. Note that voltage values of the first to third output terminals 45, 46, and 47 are not limited to these values.

The low-capacity power circuit 5 includes a third rectifying and smoothing circuit 50, a third capacitor 25, and a DC-DC converter 51. The third rectifying and smoothing circuit 50 has a diode matrix connected to the AC power source AC via the first capacitor 21 and the second capacitor 22 connected to one end and another end of the AC power source AC. The third capacitor 25 receives electric power from the second output terminal 46 via a diode D1 in the normal mode. The DC-DC converter 51 is connected to the third capacitor 25 and the controller 31, and outputs voltage having the same value as the third output terminal 47 (3.3V) to the controller 31. The DC-DC converter 51 is a step-down converter, and includes a diode and an inductor therein. A fourth capacitor 26 is provided at the output side of the DC-DC converter 51. The controller 31 is connected to the relay 30 via the relay drive line RL. The diode D1 prevents a current from flowing back from the third capacitor 25 and the fourth capacitor 26 to the DC-DC converter 43.

As described above, the DC-DC converter 51 is a step-down converter. Thus, the fourth capacitor 26 has a function of smoothing output voltages of the DC-DC converter 51 in cooperation with the diode and inductor within the DC-DC converter 51. Further, the fourth capacitor 26 complements pulse voltages outputted from the DC-DC converter 51, and hence has a battery function.

In the normal mode, upon receiving a print instruction, the controller 31 turns on the relay 30 via the relay drive line RL. The first capacitor 21 and the second capacitor 22 are charged, and this charge is supplied to the third capacitor 25 as a DC voltage by the third rectifying and smoothing circuit 50, so that the third capacitor 25 is charged. That is, a voltage having a value obtained by dividing electric charge of the first capacitor 21 and the second capacitor 22 by capacitance is supplied to the third capacitor 25, and the electric charge leaks from the both capacitors 21 and 22 to the third capacitor 25. That is, the capacitors 21 and 22 have a function of allowing a current supplied from the AC power source AC to leak therethrough so that the current is supplied to the low-capacity power circuit 5 (more specifically, the third capacitor 25) in the normal mode and in the OFF mode. Or, in a state where the switching power supply 4 is supplied with AC voltage and where a voltage (5V) is supplied from the second output terminal 46, a voltage based on that electric charge is supplied to the third capacitor 25.

When no print instruction is transmitted for a predetermined period or longer, the controller 31 turns off the relay 30 so as to stop supplying AC voltage to the switching power supply 4, and sets the laser printer 1 to the OFF mode. At this time, although DC voltages are not outputted from the first to third output terminals 45, 46, and 47, the third capacitor 25 maintains a charged state.

Sometimes a print instruction is transmitted immediately after the controller 31 sets the operational mode to the OFF mode. Because the controller 31 is supplied with a voltage from electric charge stored in the third capacitor 25, the controller 31 turns on the relay 30, and AC voltage is supplied to the switching power supply 4. In this way, in the normal mode, the third capacitor 25 is charged by the first capacitor 21 and the second capacitor 22. Thus, the operational mode can be returned immediately from the OFF mode to the normal mode. In other words, the first capacitor 21 or the second capacitor 22 is used for maintaining charge of the low-capacity power circuit 5, and hence realizes a function of the electrical circuit 3 of the laser printer 1.

Further, the both capacitors 21 and 22 are used for insulation between the primary side and the secondary side. With this insulation, the voltage at the primary side can be supplied safely to the electrical components at the secondary side.

The controller 31 may determine whether the voltage from the DC-DC converter 51 is higher than or equal to a predetermined value, thereby determining whether the charged amount of the first capacitor 21 and the second capacitor 22 (and hence the third capacitor 25) is sufficient for driving the relay 30.

As well known in the art, capacitors allow an AC current to pass (leak) therethrough. And, when an AC voltage is applied, an output current is proportional to frequency and capacitance of the AC voltage. Further, as described above, capacitance of some capacitors changes as temperature rises. The inventor of the present application conceived obtaining a capacitance change from an output current when an AC voltage is applied to the first capacitor 21 and the second capacitor 22 heated by air flow, and controlling driving of the fan 20 based on the capacitance change. In this case, it is preferable to use capacitors having a large degree of capacitance change due to temperature rise, as the first capacitor 21 and the second capacitor 22. The inventor conceived using, as such capacitor, a laminated ceramic capacitor, the capacitor being a high-dielectric constant type having barium titanate as dielectric material.

Figure 4:
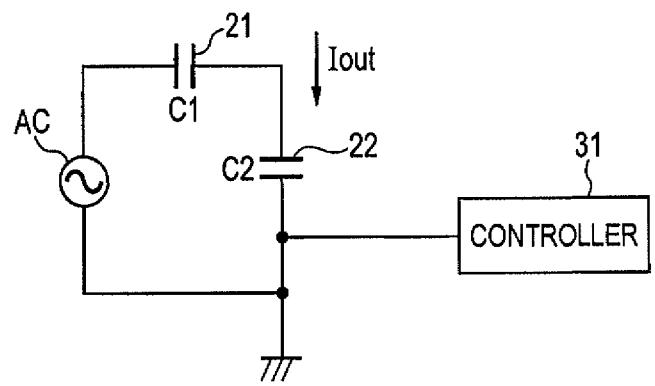
FIG. 4 is a simplified diagram showing connection relationship of an AC power source and both capacitors.

FIG. 4 shows connection relationship of the AC power source AC and the both capacitors 21 and 22. The both capacitors 21 and 22 are connected in series to the AC power source AC. The controller 31 detects a current that flows through the both capacitors 21 and 22. The both capacitors 21 and 22 have the same capacitance. More specifically, the current supplied from the DC-DC converter 51 to the controller 31 is converted to a voltage by an operational amplifier or the like, and the controller 31 monitors this voltage.

Figure 5:
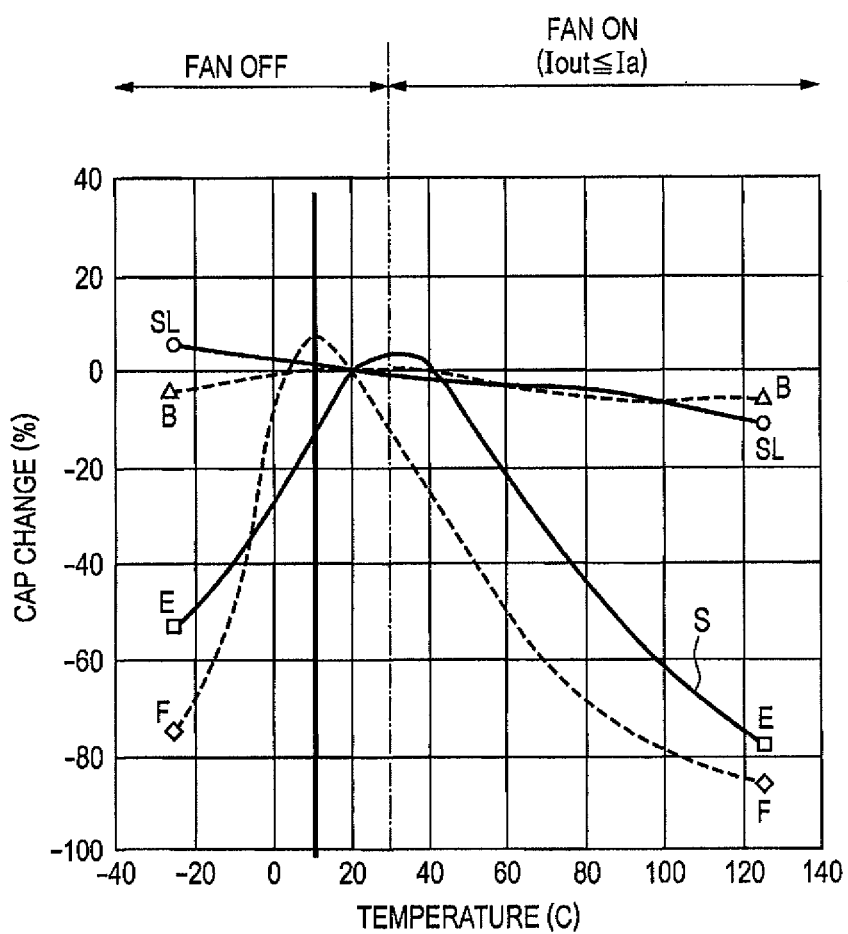
FIG. 5 is a graph showing temperature characteristics of laminated ceramic capacitors.

In FIG. 5, a solid curve S indicates temperature characteristics of the capacitors 21 and 22. In FIG. 5, the horizontal axis shows temperature (unit: degrees C.), and the vertical axis shows a change ratio of capacitance when using capacitance at temperature of 20 degrees C. as the reference. Out of a temperature range in which the electrical circuit 3 is operable, a desirable temperature range is from 30 degrees C. to 60 degrees C. As can be seen from FIG. 5, when temperature rises from 30 degrees C. to 60 degrees C., the capacitance of the capacitor 21, 22 monotonically decreases by approximately 15% to 20%. The capacitors 21 and 22 are laminated ceramic capacitors having E characteristics. It is known that capacitors having E characteristics have a large capacitance change with respect to a temperature change.

Here, the following equation is satisfied, assuming that Iout is a current value of an electric current that flows through the both capacitors 21 and 22, that V is a voltage value of the AC power source AC, that f is frequency of the AC power source AC, that C1 is capacitance of the first capacitor 21, and that C2 is capacitance of the second capacitor 22.

$$Iout = V \times 2\pi \times f \times (C1 \times C2)/(C1+C2) \qquad \text{(Equation 1)}$$

Because of C1=C2, the following equation is satisfied.

$$Iout = V \times 2\pi \times f \times C1/2 \qquad \text{(Equation 2)}$$

When the temperature of the both capacitors 21 and 22 rises from 30 degrees C. to 60 degrees C., for example, the capacitance of the both capacitors 21 and 22 decreases approximately 20 percent. Thus, based on Equation 2, Iout also decreases approximately 20 percent. In this way, the capacitance of the capacitors 21 and 22 preferably decreases by 15 to 20 percent as the temperature rises from 30 degrees C. to 60 degrees C.

<Drive Control of Fan>

The controller 31 controls driving of the fan 20, while detecting Iout.

Figure 6:
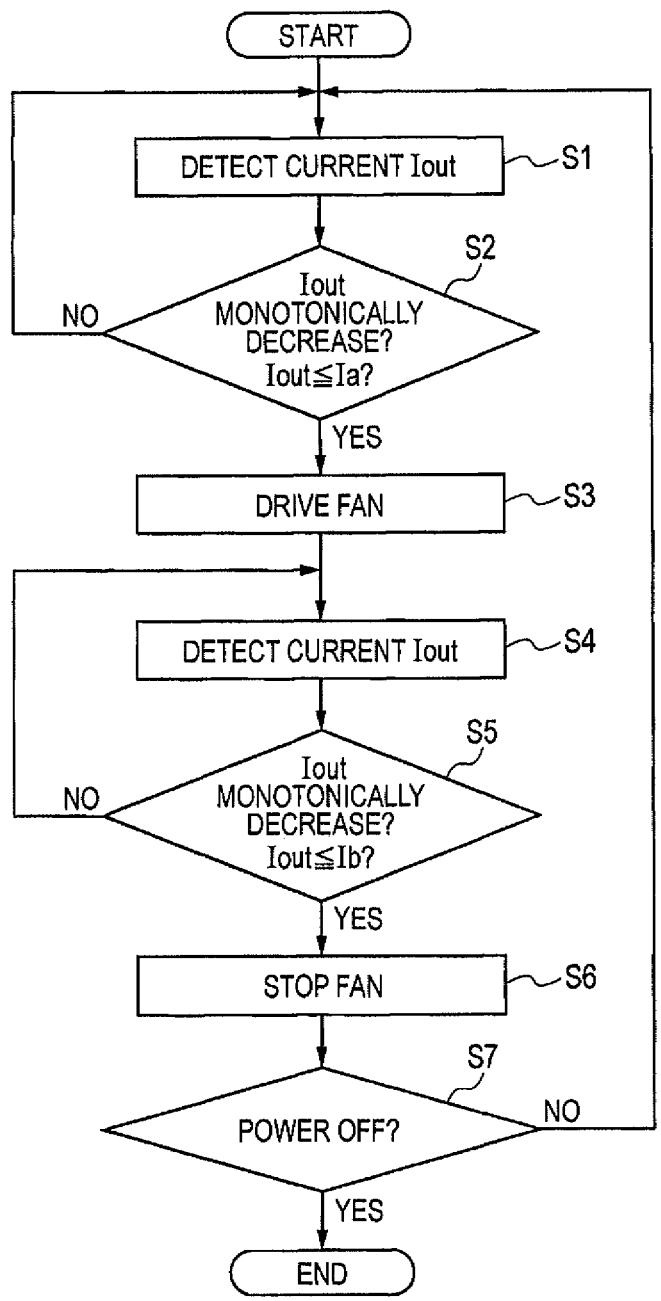
FIG. 6 is a flowchart showing control operations of a fan.

The operations of the controller 31 will be described while referring to the flowchart of FIG. 6. In this flowchart, current values Ia and Ib are values of Iout when the both capacitors 21 and 22 are at respective temperatures, and the current value Ia is a current value when Iout is the largest. Further, an inequality Ib<Ia is satisfied. In the present embodiment, the temperature at Ia is approximately 30 degrees C. at which the capacity starts monotonically decreasing in the solid curve S of FIG. 5. In an initial state, it is assumed that the fan 20 is stopped and ambient temperature is 20 degrees C.

First, when the power of the laser printer 1 is turned on, the controller 31 detects a current value Iout that flows through the both capacitors 21 and 22 (Step S1; "Step" will be hereinafter abbreviated as "S").

Next, the controller 31 determines whether Iout monotonically decreases and determines whether a condition is satisfied that Iout is smaller than or equal to a predetermined current value Ia (S2). If this condition is not satisfied (S2: No), the controller 31 detects the current value Iout (S1), and again determines whether the condition is satisfied (S2). At the initial state, an inequality Iout<Ia is satisfied. Because Iout does not monotonically decrease, the process returns to S1.

If the laser printer 1 is continued to be driven, more specifically, if a print operation is repeated, the electrical circuit 3 including the transformer 2 is heated, and the temperature of the both capacitors 21 and 22 increases and exceeds 30 degrees C. Then, after the value of Iout reaches Ia, the capacitance of the both capacitors 21 and 22 monotonically decreases, and the current value Iout gradually decreases. That is, the condition of S2 is satisfied.

Then, the controller 31 detects this and starts driving of the fan 20 (S3). By starting driving of the fan 20, air-cooling of the electrical circuit 3, the transformer 2, and the both capacitors 21 and 22 is started. The controller 31 continues detecting the current value Iout that flows through the both capacitors 21 and 22 (S4).

By continuing such air-cooling, the temperature of the electrical circuit 3 and the both capacitors 21, 22 decreases. The capacitance of the both capacitors 21 and 22 monotonically increases, which causes the current value Iout to gradually increase. Once the current value Iout reaches Ia, after that, the current value Iout monotonically decreases.

Next, the controller 31 determines whether the value of Iout monotonically decreases and whether a condition is satisfied that the value of Iout is smaller than or equal to a predetermined current value Ib (S5). If this condition is not satisfied (S5: No), the controller 31 continues detecting the current value Iout (S4), and again determines whether the condition is satisfied (S5).

If the value of Iout monotonically decreases and reaches the current value Ib, the electrical circuit 3 and the both capacitors 21 and 22 are sufficiently air-cooled, and hence the controller 31 stops driving of the fan 20 (S6). With this stopping operation, wasteful power consumption by the fan 20 is prevented.

After that, if the power of the laser printer 1 is not turned off (S7: No), the controller 31 returns to S1 and detects the current value Iout that flows through the both capacitors 21 and 22. If the power of the laser printer 1 is turned off (S7: Yes), the process ends.

As described above, because the controller 31 controls driving of the fan 20, the electrical circuit 3 can be driven within a desired temperature range.

In the above-described example, the fan 20 is controlled to be switched between a driven state and a stopped state. However, the fan 20 may be controlled to change the rotational speed without stopping the fan 20.

Effects of Embodiment

The laser printer 1 of the present embodiment has the following effects.

(1) The controller 31 controls operations of the fan 20 based on a capacitance change of the capacitors 21 and 22 that are provided for achieving a function needed for realizing the electrical circuit 3. That is, the capacitors 21 and 22 that achieve a function needed for realizing the electrical circuit 3 are also used for controlling operations of the fan 20. Accordingly, it is unnecessary to provide a component dedicated for controlling the fan 20, which suppresses an increase in the number of components for controlling the fan 20.

(2) The capacitors 21 and 22 are arranged at the joining position of both air flows that have cooled the first portion A1 and the second portion A2 connected to the both windings 23 and 24 of the transformer 2. Thus, the capacitors 21 are 22 are easily affected by a temperature rise due to heat generation of the transformer 2. This easily causes capacitance changes of the capacitors 21 and 22, and hence the operations of the fan 20 can be controlled accurately.

(3) If the capacitance changes of the capacitors 21 and 22 due to temperature rise are small, it is difficult for the controller 31 to detect a capacitance change. Thus, there is a possibility that it is difficult for the controller 31 to control the operations of the fan 20 accurately. On the other hand, if the capacitance changes of the capacitors 21 and 22 due to temperature rise are large, there is a possibility that original characteristics of the electrical circuit 3 may be impaired. Hence, by using a laminated ceramic capacitor as the capacitor, the capacitance changes due to temperature rise are set within an appropriate range. Further, both accurate control of the fan 20 and characteristics of the electrical circuit 3 are achieved concurrently.

While the invention has been described in detail with reference to the above aspects thereof, it would be apparent to those skilled in the art that various changes and modifications may be made therein without departing from the scope of the claims.

For example, in the above-described embodiment, a laminated ceramic capacitor is used as the capacitor. However, the capacitor is not limited to this. Another capacitor may be used as long as the capacitor achieves a function needed for the characteristics of the electrical circuit 3 and as long as a capacitance change due to temperature rise is larger than or equal to a predetermined value.

Further, although two capacitors 21 and 22 are used in the above-described embodiment, either one of the capacitors 21 and 22 may be used.

Further, in the above-described embodiment, the capacitance of the capacitors 21 and 22 monotonically decreases as temperature rises. However, such a capacitor may be used that the capacitance of the capacitor monotonically increases as temperature rises.

Further, in the above-described embodiment, the fan 20 is provided between the discharge opening 13 and the capacitors 21, 22. However, the fan 20 may be provided at the discharge opening 13. In other words, the fan 20 may be provided in the discharge opening 13 or adjacent to the discharge opening 13.

What is claimed is:

1. An electrical apparatus comprising:
   a casing in which a driven component is provided, the driven component being driven in response to an external input supplied from outside the casing;
   a controller configured to switch an operational mode between: a normal mode in which the driven component is driven in response to the external input; and an OFF mode in which the driven component is in a standby state without receiving the external input for a period longer than a particular period;
   an electrical circuit provided in the casing, the electrical circuit comprising an electrical component configured to generate heat due to energization;
   a temperature-change detection capacitor provided in the casing, the temperature-change detection capacitor having a particular function needed for realizing the electrical circuit;
   a normal-mode returning capacitor provided in the casing, the normal-mode returning capacitor being provided separately from the temperature-change detection capacitor, the normal-mode returning capacitor being charged through the temperature-change detection capacitor for returning the operational mode from the OFF mode to the normal mode; and
   a flow creator configured to create, in the casing, an air flow that flows in a direction from the electrical component to the temperature-change detection capacitor such that air heated by heat generation of the electrical component flows to the temperature-change detection capacitor;
   wherein the controller is configured to control the flow creator;
   wherein the temperature-change detection capacitor has a characteristic that capacitance monotonically decreases or monotonically increases as temperature rises, in a part of a temperature range in which the electrical circuit operates;
   wherein the controller is configured to detect a capacitance change due to a temperature change of the temperature-change detection capacitor caused by the air heated by the heat generation, and to control the flow creator based on a detection result of the capacitance change;
   wherein the electrical circuit comprises a low-capacity power circuit provided between the temperature-change detection capacitor and the controller;
   wherein the electrical apparatus is configured to take: a normal mode in which the electrical apparatus is configured to execute a particular process immediately in response to a particular instruction; and an OFF mode in which the electrical apparatus is in a standby state after the particular instruction is not transmitted for a particular period; and
   wherein the temperature-change detection capacitor has, as the particular function, a function of allowing a current supplied from a power source to leak therethrough so that the current is supplied to the low-capacity power circuit in the normal mode and in the OFF mode.

2. The electrical apparatus according to claim 1, wherein the casing has a discharge opening; and
   wherein the flow creator is provided at one of a position where the discharge opening is provided and a position between the temperature-change detection capacitor and the discharge opening.

3. The electrical apparatus according to claim 1, wherein the electrical circuit comprises a plurality of electrical components;
   wherein one of the plurality of the electrical component is a transformer provided for a power source, the transformer having primary winding and secondary winding;
   wherein the electrical circuit has a first portion connected to the primary winding and a second portion connected to the secondary winding;
   wherein the flow creator is configured to create a first air flow that mainly passes the first portion and a second air flow that mainly passes the second portion;
   wherein at least one of the first air flow and the second air flow passes the transformer; and
   wherein the first air flow and the second air flow join together at a position where the temperature-change detection capacitor is disposed.

4. The electrical apparatus according to claim 1, wherein the part of the temperature range is a temperature range from 30 degrees C. to 60 degrees C.; and
   wherein the capacitance of the temperature-change detection capacitor decreases by 15 to 20 percent as the temperature rises from 30 degrees C. to 60 degrees C.

5. The electrical apparatus according to claim 1, wherein the electrical circuit comprises a low-capacity power circuit; and
   wherein the normal-mode returning capacitor is used to maintain charged power of the low-capacity power circuit.

6. The electrical apparatus according to claim 1, wherein the temperature-change detection capacitor is a laminated ceramic capacitor having barium titanate as dielectric material.

7. The electrical apparatus according to claim 1, wherein the electrical circuit further comprises:
   a switching power supply configured to output a voltage in the normal mode;
   wherein the low-capacity power circuit is configured to receive the voltage outputted from the switching power supply in the normal mode, and to receive a voltage outputted from the power source in the normal mode and in the OFF mode; and
   wherein the controller is configured to operate, in the OFF mode, by receiving a voltage supplied from the low-capacity power circuit.

8. The electrical apparatus according to claim 1, wherein the electrical circuit is configured to be connected to a power source;
   wherein the temperature-change detection capacitor is provided between the power source and the controller; and
   wherein the temperature-change detection capacitor is configured to allow a current supplied from the power source to leak therethrough so that the current is supplied to the controller.

9. A method of controlling a flow creator in an electrical apparatus, the method comprising:
preparing an electrical apparatus including: a casing in which a driven component is provided, the driven component being driven in response to an external input supplied from outside the casing; a controller configured to switch an operational mode between: a normal mode in which the driven component is driven in response to the external input; and an OFF mode in which the driven component is in a standby state without receiving the external input for a period longer than a particular period; an electrical circuit provided in the casing, the electrical circuit comprising an electrical component configured to generate heat due to energization; a temperature-change detection capacitor provided in the casing, the temperature-change detection capacitor having a particular function needed for realizing the electrical circuit, the electrical circuit being provided between the controller and the temperature-change detection capacitor; a normal-mode returning capacitor provided in the casing, the normal-mode returning capacitor being provided separately from the temperature-change detection capacitor, the normal-mode returning capacitor being charged through the temperature-change detection capacitor for returning the operational mode from the OFF mode to the normal mode; and a flow creator configured to create, in the casing, an air flow that flows in a direction from the electrical component to the temperature-change detection capacitor such that air heated by heat generation of the electrical component flows to the temperature-change detection capacitor, the temperature-change detection capacitor having a characteristic that capacitance monotonically decreases or monotonically increases as temperature rises, in a part of a temperature range in which the electrical circuit operates;
operating in a normal mode in which the electrical apparatus is configured to execute a particular process immediately in response to a particular instruction; and an OFF mode in which the electrical apparatus is in a standby state after the particular instruction is not transmitted for a particular period, the particular function of the temperature-change detection capacitor being a function of allowing a current supplied from a power source to leak therethrough so that the current is supplied to the low-capacity power circuit in the normal mode and in the OFF mode;
detecting a capacitance change due to a temperature change of the temperature-change detection capacitor caused by the air heated by the heat generation; and
controlling the flow creator based on a detection result of the capacitance change.

10. The electrical apparatus according to claim 1, wherein the normal-mode returning capacitor is not used for temperature change detection.

11. The electrical apparatus according to claim 1, wherein the temperature-change detection capacitor comprises two temperature-change detection capacitors;
wherein the two temperature-change detection capacitors are connected in series to an AC power source; and
wherein the controller detects a current that flows through the two temperature-change detection capacitors.

12. The electrical apparatus according to claim 11, wherein the two temperature-change detection capacitors have a same capacitance; and
wherein the current that flows through the two temperature-change detection capacitors is obtained by an equation $Iout = V \times 2\pi \times f \times C/2$, assuming that Tout is the current, that V is a voltage of the AC power source AC, that f is frequency of the AC power source AC, that C is the capacitance of each of the two temperature-change detection capacitors.

13. The electrical apparatus according to claim 11, wherein the controller is configured to:
determine whether the current monotonically decreases and whether a first condition is satisfied that the current is smaller than or equal to a first current value;
in response to determining that the current monotonically decreases and that the first condition is satisfied, start driving of the flow creator;
determine whether the current monotonically decreases and whether a second condition is satisfied that the current is smaller than or equal to a second current value; and
in response to determining that the current monotonically decreases and that the second condition is satisfied, stop driving of the flow creator.

* * * * *

UNITED STATES PATENT AND TRADEMARK OFFICE
CERTIFICATE OF CORRECTION

PATENT NO. : 10,042,337 B2
APPLICATION NO. : 14/668411
DATED : August 7, 2018
INVENTOR(S) : Tetsuya Kitajima Page 1 of 1

It is certified that error appears in the above-identified patent and that said Letters Patent is hereby corrected as shown below:

In the Claims

Claim 12:
Column 12, Line 24: Delete "Tout" and insert -- Iout -- therefor.

Signed and Sealed this
Ninth Day of October, 2018

Andrei Iancu
*Director of the United States Patent and Trademark Office*